Figure 1:
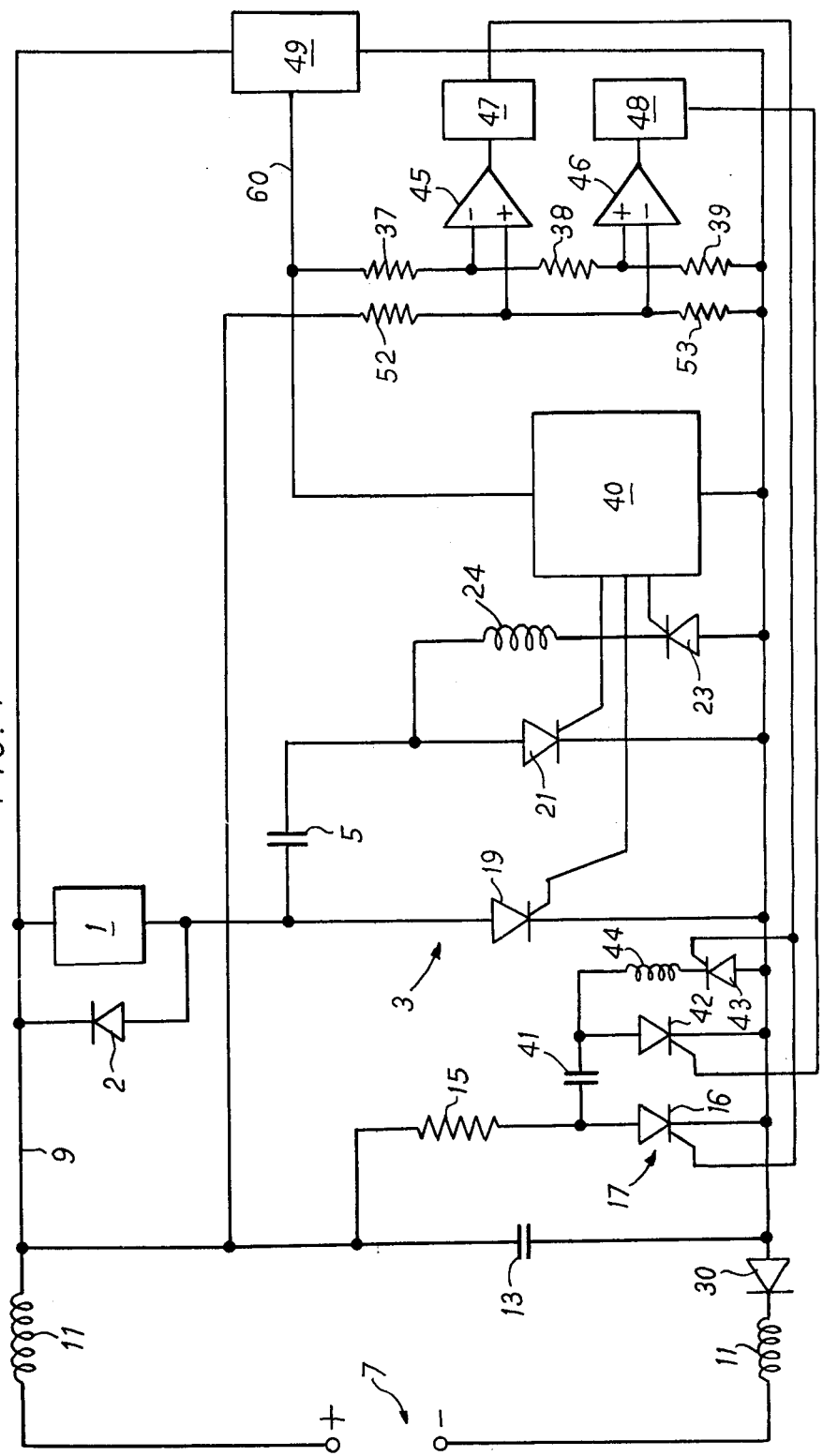

United States Patent [19]

Gurwicz

[11] 4,093,980
[45] June 6, 1978

[54] D.C. ELECTRICAL CIRCUIT MEANS

[75] Inventor: David Gurwicz, Gateshead, England

[73] Assignee: Sevcon Limited, Gateshead, England

[21] Appl. No.: 784,123

[22] Filed: Apr. 4, 1977

[30] Foreign Application Priority Data

Apr. 8, 1976 United Kingdom ............... 14212/76

[51] Int. Cl.² ............................................. H02M 1/14
[52] U.S. Cl. ........................................ 363/57; 363/124
[58] Field of Search ................... 320/1; 321/10, 43, 44, 321/45 C, 45; 363/57, 124

[56] References Cited

U.S. PATENT DOCUMENTS

| 3,379,955 | 4/1968 | Koetsch | 321/45 C |
| 3,414,792 | 12/1968 | Mui et al. | 320/1 |
| 3,766,433 | 10/1973 | Nowell | 320/1 X |
| 3,819,983 | 6/1974 | Bjork | 320/1 X |
| 3,826,959 | 7/1974 | Anderson | 321/45 C X |
| 3,863,126 | 1/1975 | Colyn | 320/1 |
| 3,868,562 | 2/1975 | Marshall | 320/1 X |

*Primary Examiner*—William M. Shoop
*Attorney, Agent, or Firm*—Alfred H. Rosen

[57] ABSTRACT

In electrical circuit means having a load, an SCR pulse controller in series with the load and including a commutation capacitor, a transmission line connected to the load and pulse controller to supply the load from a D.C. source, and, a reservoir capacitor shunting the transmission line, the provision of control means which during interpulse periods of the controller by repeatedly discharging the reservoir capacitor limit the voltage to which the reservoir capacitor charges above the voltage of the source.

8 Claims, 2 Drawing Figures

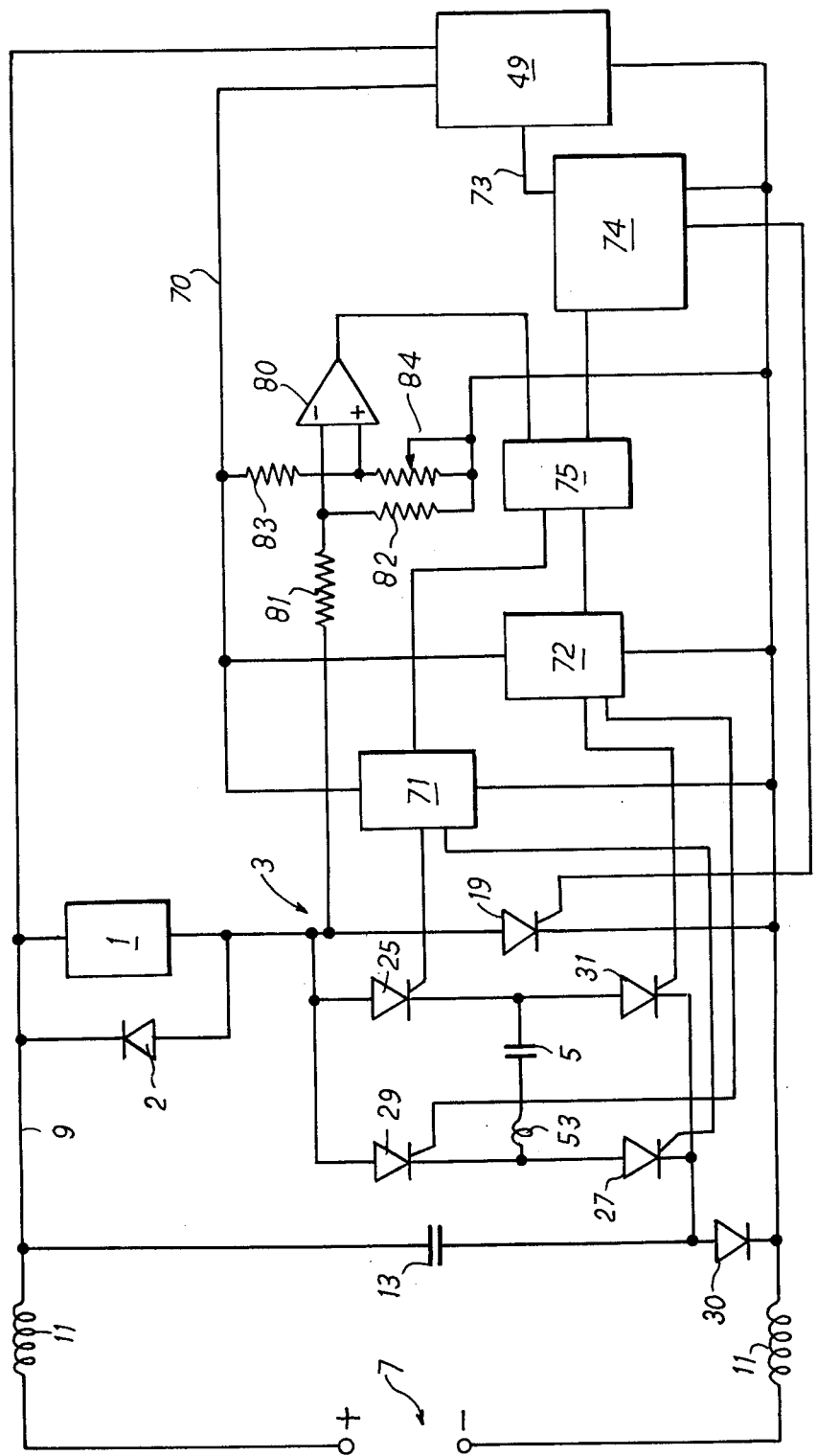

D.C. ELECTRICAL CIRCUIT MEANS

This invention relates to D.C. electrical circuit means and more particularly to such circuit means comprising a load, an SCR (Silicon Controlled Rectifier) pulse controller connected in series with the load and including a commutation capacitor, a transmission line connected to the series path of the load and pulse controller to supply the load from a D.C. source which during interpulse periods (i.e., periods during which the controller disconnects the load from the D.C. source) effects charging of the commutating capacitor, and, a reservoir capacitor shunting the transmission line to limit the voltage to which the commutating capacitor is charged from the D.C. source during interpulse periods.

In circuits of the kind set forth the reservoir capacitor is present to prevent the voltage to which the commutating capacitor charges owing to the inductance of the transmission line rising to extremely high levels. The capacitance, however, of such reservoir or line shunting capacitors in known circuits is considerable, typically 65,000 microfarads, in order to limit to an acceptable value the voltage to which the commutating capacitor is forward charged during the interpulse periods.

The object of this invention is to provide improved electrical circuit means of the kind set forth in which the capacitance of the reservoir or shunting capacitor required to effect limitation of the forward charge voltage on the commutating capacitor is appreciably diminished.

The present invention consists in D.C. electrical circuit means of the kind set forth, wherein there are provided control means adapted during each interpulse period by repeatedly discharging the reservoir capacitor to limit the voltage to which during said interpulse periods the reservoir capacitor charges above the voltage of the source.

Suitably the control means include energy extracting means for extracting energy from the reservoir capacitor and the transmission line and comparator means adapted to compare the voltage on the reservoir capacitor with a pre-set voltage in excess of the source voltage so that when the capacitor voltage exceeds the pre-set voltage the comparator means actuate the energy extracting means to reduce the capacitor voltage to a level at which the comparator means cease to actuate the energy extracting means thereby enabling the capacitor voltage to increase.

In one form of electrical circuit means according to the invention, the control means include comparator means and, connected in parallel with the reservoir capacitor, a resistive circuit including a pulse controller actuated by the comparator means to render the resistive circuit alternately conducting and non-conducting respectively to discharge and to permit increase of charge on the reservoir capacitor when, during each interpulse period, the reservoir capacitor voltage rises to a predetermined level above the D.C. source voltage.

In another form of electrical circuit means according to the invention, the control means comprise switching circuit means adapted to control the reservoir capacitor voltage during interpulse periods by repeatedly discharging and re-charging the commutating capacitor when during interpulse periods, the reservoir capacitor attains a predetermined voltage above the D.C. source voltage. Where the commutating capacitor circuit comprises a bridge of thyristors connected to respective diagonals of which are a commutating capacitor and a main thyristor of the pulse controller of the load, the control means comprise switching cicuit means for the bridge thyristors which operate repeatedly to reverse the connections of the commutating capacitor to the D.C. source when the voltage on the reservoir capacitor during interpulse periods exceeds the source voltage by a predetermined amount thereby to discharge and recharge in the reverse sense the commutating capacitor, the reservoir capacitor voltage falling during discharge and rising during reverse charging of the commutating capacitor.

The invention will now be described, by way of example, with reference to FIGS. 1 and 2 of the accompanying drawings which are circuit diagrams illustrating respective embodiments of the invention.

Throughout the drawings like circuit elements have been designated with the same references.

Referring to the drawings, a load 1, for example, a D.C. traction motor of a locomotive, has connected in series therewith an SCR pulse controller generally designated 3. Connected across the load 1 is a free wheel diode 2 for maintaining current flow through the load when the pulse controller 3 is non-conducting, that is to say, during interpulse periods. The pulse controller includes a commutating capacitor 5 which, as hereinafter described, is charged from a D.C. source 7 during interpulse periods, that is to say, periods when the controller is non-conducting and, accordingly, effects disconnection of the load 1 from the source 7.

The D.C. source is connected to the series path of the load 1 and controller 3 by a transmission line 9 having distributed inductance which for the sake of convenience is illustrated in the drawings as inductors 11. A line shunting or reservoir capacitor 13 is provided to limit the charge attained by the commutating capacitor 5 which, owing to the inductance of the transmission line 9 would otherwise reach an extremely high value. The present invention is concerned to limit the capacitance of the capacitor 13 and to this end provides control means which are adapted to limit, during interpulse periods, the voltage to which the reservoir capacitor charges in excess of the voltage of the D.C. source 7. These control means in the embodiment of the invention illustrated in FIG. 1 comprise a resistor 15 connected in series with a further SCR pulse controller 17, the series path of the circuit elements 15 and 17 shunting the reservoir capacitor 13. It will be noted that the controller 3 includes a main SCR or thyristor 19 which is shunted by the commutating capacitor 5 and turn-off thyristor 21. A capacitor charge reversal path is provided in the controller 3 by main thyristor 19, reversal thyristor 23 and inductor 24. As is well-known, commutation of the main thyristor 19 is initiated by firing into conduction of turn-off thyristor 21. This has the effect of discharging capacitor 5 which subsequent to discharge is forward charged from the source 7. When the capacitor 5 is fully forward charged the current through turn-off thyristor 21 ceases and that thyristor becomes self-commutated. Thyristors 19 and 23 are next simultaneously fired thereby to reverse the charge on the commutating capacitor and cause a current pulse through the load 1. The reversal of charge on the commutating capacitor 5 enables the capacitor to be presented on the next firing into conduction of the thyristor 21 across thyristor 19 with correct polarity to effect commutation of thyristor 19.

The pulse controller 17 is of similar form to the controller 3 having a main SCR or thyristor 16 shunted by a commutating capacitor 41 and a turn-off thyristor 42 in series with the capacitor 41. The thyristor 42 has connected in parallel therewith a thyristor 43 and inductor 44 which together with the main thyristor 16 afford a charge reversal path for the capacitor 41. Assuming that the commutating capacitor 41 is fully charged with its left-hand plate positive with respect to its right-hand plate, the firing into conduction of thyristors 16 and 43 causes current flow, as hereinafter more fully described, through the resistor 15 and reversal of the charge on the capacitor 41. When the latter is fully reverse charged it applies reverse polarity to thyristor 43 which is thus commutated. The capacitor 41 now has the correct polarity in order that a subsequent firing into conduction of turn-off thyristor 42 will cause the commutating capacitor 41 to turn off the thyristor 16 and be forward charged by way of the resistor 15, i.e., with its left-hand plate positive with respect to its right-hand plate.

The diode 30 between the common point of the cathodes of thyristors 19, 21, 16 and 42 and the capacitor 13 and the transmission line serves to prevent the capacitor 13 resonating with the inductance of the line 9. Connected across the series path of the load 1 and main thyristor 19 is a voltage stabilizing circuit 49 of known form which provides a stabilized voltage rail 60 supplying the logic circuitry which operates the controllers 3 and 17. Thus, between the rail 60 and the cathode side of thyristors 19 and 21 is connected a control circuit 40 which is a known form including an "off" oscillator for switching thyristor 21 into conduction in order to commutate thyristor 19, and, an "on" oscillator for firing thyristors 19 and 23 simultaneously into conduction to cause a current pulse through the load 1 and reversal of the charge on the commutating capacitor 5.

Also connected between the stabilised voltage rail 60 and the cathode side of thyristors 19 and 21 is a chain of series connected resistors 37, 38 and 39 which from a point between resistors 37 and 38 provides a reference input to a first comparator 45 comprising an operational amplifier, and from a point between resistors 38 and 39 provides a reference input to a second comparator 46 also in the form of an operational amplifier. The comparators 45 and 46 have their outputs connected to driver circuits 47 and 48 of known form which in turn respectively have their outputs connected to the gate electrodes of thyristors 16 and 43 and to the gate electrode 42.

Connected across the capacitor 13 is a pair of series connected resistors 52 and 53 which at the common point thereof connect with each of the comparators 45 and 46 to provide a voltage input thereto which varies in accordance with the voltage at the plate of capacitor 13 connected to the positive side of the transmission line 9. It will be observed that in the case of comparator 45 the non-inverting input is connected to the junction of resistors 52 and 53 and that, accordingly, when the voltage at this input exceeds the voltage at the common point of resistors 37 and 38, the output of comparator 45 causes driver circuit 47 to switch thyristors 16 and 43 into conduction. In the case of comparator 46 the inverting input is that which is connected to the common point of resistors 52 and 53 but in this instance the output of the comparator 46 is changed when the voltage at the inverting input falls below that at the common point of resistors 38 and 39 with the result that the output of the comparator 46 causes driver circuit 48 to switch thyristor 42 into conduction.

In operation of the circuit of FIG. 1, during the interpulse periods when thyristors 19 and 23 are in the non-conducting condition the commutating capacitor 5 is fully forward charged, that is to say, the left-hand plate thereof is positive with respect to the right-hand plate and this capacitor cannot discharge via the diode 2, transmission line 9 and thyristor 23 because the latter is in the non-conducting condition and also because of the presence of diode 30. The forward charging of the capacitor 5 was effected due to conduction of the thyristor 21 which initially caused discharge of the capacitor 5 to commutate the main thyristor 19 and subsequent forward charging of capacitor 5. As the capacitor 5 is forward charged inductively via the transmission line 9, the shunting capacitor 13 is also being forward charged from the transmission line. Because of the inductive nature of the transmission line 9 the capacitor 13 is charged above the voltage of the source 7 and when the charge level of the capacitor 13 in excess of the voltage of the source 7 reaches a predetermined magnitude, the comparator 45 causes the driver circuit 47 to switch thyristors 16 and 43 into conduction. Energy is then drawn from both the transmission line 9 and the capacitor 13 through the resistor 15 and thyristor 16 and at the same time the charge on capacitor 41 which at the end of a previous cycle of operation was left with its left-hand plate positive with respect to its right-hand plate, is reversed. When owing to conduction of energy from the capacitor 13 and transmission line 9 by way of the resistor 15 and thyristor 16 the voltage on capacitor 13 falls, the output of the comparator 45 changes state and the driver circuit 47 no longer supplies a pulse to the gate electrodes of thyristors 16 and 43. When the capacitor 13 has discharged to a voltage level which is a predetermined amount below the voltage of the source 7 the comparator 46 will provide an input to the driver circuit 48 so that the latter turns thyristor 42 into the conducting condition with the result that the commutating capacitor 41 is discharged to effect commutation of thyristor 16 and is subsequently forward charged with its left-hand plate positive with respect to its right-hand plate. The capacitor 13 then again absorbs energy from the transmission line until its voltage reaches the predetermined level above the source voltage whereupon a conducting path is again provided by way of resistor 15. The process repeats during the interpulse period until such time as the transmission line fails to supply sufficient energy to the capacitor 13 to raise its voltage to the requisite level to cause the comparator 45 to effect turning into conduction of thyristors 16 and 43 by way of the driver circuit 47.

Because of the repeated discharge of capacitor 13 during interpulse periods, appreciable heat dissipation in resistor 15 takes place and this can be employed in the case of a locomotive for passenger heating.

In a typical case, the voltage on capacitor 13 is allowed to rise to a level which is twice the voltage of the source 7 and this involves using appropriately rated components elsewhere in the circuit. It will be noted that although the voltage on the capacitor 13 is fluctuating no loss of commutation energy on capacitor 5 occurs since the voltage fluctuations on capacitor 13 take place during the interpulse period when owing to the diode 30 and the non-conducting condition of thyristor 23, the capacitor 5 has no discharge path.

In this particular circuit it will be seen that if in the event of disconnection from the transmission line 9 of some load other than the load 1 a transient voltage were to occur, the same voltage limiting system which limits the voltage on capacitor 13 would operate.

Referring now to FIG. 2, the commutating circuit of the main thyristor of pulse controller 3 is in the form of a bridge network of four thyristors 25, 27, 29 and 31. One diagonal of the bridge is formed by the common points of the anodes of thyristors 25 and 29 and of the cathodes of thyristors 27 and 31. This diagonal is connected to the anode of thyristor 19 and by way of the diode 30 to the cathode of thyristor 19. The diode 30 has its anode also connected to the negative side of the capacitor 13 and serves, as before, to prevent resonance between capacitor 13 and the inductance of the transmission line 9. Capacitor 5 in series with inductor 53 is connected across the other diagonal of the thyristor bridge, that is to say, between the common points of the cathode of thyristor 29 and anode of thyristor 27 and the cathode of thyristor 25 and anode of thyristor 31.

The voltage stabilizing circuit 49 is connected across the series path of the load 1 and the main thyristor 19 and affords a stabilized voltage rail 70 between which and the cathode of thyristor 19 are connected respective driver circuits 71 and 72. Output connections of the driver circuit 71 connect with the gate electrodes of the bridge thyristors 25 and 27 whilst output connections of the driver circuit 72 connect with the gate electrodes of bridge thyristors 29 and 31.

Between a further stabilised voltage rail 73 provided by the circuit 49 and the cathode of thyristor 19 is connected a pulse generating circuit 74 pulses from which are supplied to a bistable circuit 75 so as periodically to chaange the state of the bistable circuit. It will be appreciated, accordingly, that the controller 3 is a fixed frequency variable pulse width controller though this is not essential and, for instance, need not be the case in the embodiment of FIG. 1. Outputs of the bistable circuit 75 are connected to respective inputs of the driver circuits 71 and 72. Thus when the pulses from the pulse generating circuit 74 change the state of bistable circuit 75, an output voltage from the latter is switched from one of the driver circuits 71 and 72 to the other driver circuit. When the state of the bistable is next changed by an input from the pulse generating circuit 74 the output from the bistable is switched back to the first of the driver circuits which it was supplying. Thus, the pulse generating circuit 74 causes the bistable 75 alternately at fixed intervals of time to operate driver circuits 71 and 72.

In order to control the voltage to which capacitor 13 rises above the supply voltage upon commutation of the main thyristor 19, there is provided a comparator 80, in the form of an operational amplifier, the inverting input of which connects with the common point of series resistors 81 and 82 which at their ends remote from the common point thereof are connected respectively to the anode and cathode of the main thyristor 19. The non-inverting input of the comparator 80 is connected to the common point of a resistor 83 and variable resistor 84 the ends of which remote from the common point thereof are connected respectively to the stabilized voltage rail 70 and the cathode of the main thyristor 19. The output of the comparator 80 connects with an input of the bistable circuit 75. When the voltage at the inverting input of the comparator 80 rises above the level of the voltage at the non-inverting input thereof, the comparator causes the bistable circuit 75 to switch the output thereof from whichever of the driver circuits 71 and 72 was being supplied with an output to the other of those driver circuits.

When the voltage at the inverting input of the comparator 80 drops below that of the non-inverting input, output of the comparator 80 is again set to trigger the bistable circuit 75 when the voltage at the inverting input rises again.

In operation, assuming that thyristor 19 is conducting and that capacitor 5 has been fully charged from a previous cycle of operation with its left-hand plate positive with respect to its right-hand plate, in order to terminate conduction of thyristor 19, thyristors 25 and 27 are fired into conduction by reason of the driver circuit 71 receiving a pulse from the bistable circuit 75 in consequence of the latter having received a pulse from the pulse generating circuit 74. Capacitor 5, accordingly, discharges drawing energy from the line 9 and capacitor 13 and commutates thyristor 19 and then re-charges with its right-hand plate positive with respect to its left-hand plate. Because of the inductance of the transmission line 9, both capacitors 5 and 13 re-charge to a level above the voltage of the source 7 and when this voltage level exceeds a predetermined value above the voltage of the source 7, the voltage at the inverting input of the comparator 80 rises above that at the non-inverting input so that the comparator 80 provides an output which operates the bistable circuit 75 to switch the output voltage thereof to the driver circuit 72 so that the latter then provides an output which switches thyristors 29 and 31 into conduction. The capacitor 5, accordingly, discharges again drawing energy from the line 9 and capacitor 13 and commutates thyristors 25 and 27 and then re-charges together with capacitor 13 with its left-hand plate positive with respect to its right-hand plate. As re-charging of capacitor 5 proceeds, the voltage level on the capacitors 5 and 13 again rises and when the level thereof exceeds the predetermined value the comparator 80 again operates the bistable circuit 75 which causes the voltage output of the bistable circuit 75 to be switched back from the driver circuit 72 to the driver circuit 71, with the result that thyristors 25 and 27 are switched into conduction. The capacitor 5 once again discharges drawing energy from the transmission line 9 and the capacitor 13 and in so doing commutates thyristors 29 and 31 and re-charges so that the right-hand plate of capacitor 5 becomes positive with respect to its left-hand plate. During re-charging of capacitor 5 the voltage on capacitor 13 again rises and at the predetermined value the inverting input of the comparator 80 again exceeds the non-inverting input thereof. The cycle of operations continues until the capacitor 5 receives insufficient energy from the line 9 and capacitor 13 to elevate the voltage at the inverting input of the comparator 80 to a level above that of the non-inverting input.

Let it be assumed that the potential across the capacitor 5 at the instant of firing one pair of the bridge thyristors is V volts. This implies that the anode of thyristor 19 is depressed below the voltage of the supply 7 by this potential difference, V volts. Since the capacitor 5 is discharged and then re-charged by current flowing in the load 1, the wave form at the anode of thyristor 19 will rise linearly from $-V$ to $+V$ volts and it can, therefore, be stated that effectively the anode of thyristor 19 has been at an average potential of zero volts for the total commutation period. The change in the charge on capacitor 5 is given by twice the product of the voltage and the capacitance, i.e., $2 VC_5$. To a first approximation this charge has been supplied by the energy in the line and by removal of charge from the capacitor 13. Thus, the voltage on capacitor 13 is reduced below its peak voltage V to some other lower voltage. When capacitor 13 re-charges to the value V volts, the appropriate thyristors of the commutation bridge are re-fired into conduction and a sawtooth voltage wave form is experienced by capacitor 13 with its peak excursion at the value V volts and its trough at some value below V volts, dependent on the ratio of the capacitors 5 and 13 and the quantum of energy extracted from the line 9. Accordingly, each charge reversal of capacitor 5 is utilised as useful power in the load 1.

It will be apparent that the embodiments of FIGS. 1 and 2 whilst they have the same purpose differ in that in the embodiment of FIG. 1, the line energy is dissipated in a resistor whilst in the embodiment of FIG. 2 the line energy is usefully employed.

In general, the embodiment of FIG. 2 is regarded as the preferable mode of performing the invention.

The invention enables a reduction of the capacitance of the shunting or reservoir capacitor 13 to a value typically of a few hundred microfarads which represents a considerable saving of capacitance when compared with previously used circuits.

I claim:

1. In electrical circuit means comprising a load, an SCR pulse controller connected in series with the load and including a commutation capacitor, a transmission line connected to the series path of the load and pulse controller to supply the load with energy from a D.C. source which during interpulse periods effects charging of the commutating capacitor, and a reservoir capacitor shunting the transmission line to limit the voltage to which the commutating capacitor is charged from the D.C. source owing to inductance of the transmission line during interpulse periods, the improvement comprising control means for repeatedly discharging the reservoir capacitor during each interpulse period so as to limit the voltage to which during said interpulse periods the reservoir capacitor charges above the voltage of the source.

2. Electrical circuit means as claimed in claim 1 wherein the control means include energy extracting means for extracting energy from the reservoir capacitor and the transmission line and comparator means adapted to compare the voltage on the reservoir capacitor with a pre-set voltage in excess of the source voltage so that when the capacitor voltage exceeds the pre-set voltage the comparator means actuate the energy extracting means to reduce the capacitor voltage to a level at which the comparator means cease to actuate the energy extracting means thereby enabling the capacitor voltage to increase.

3. Electrical circuit means as claimed in claim 1 wherein the control means include comparator means and, connected in parallel with the reservoir capacitor, a resistive circuit including a pulse controller actuated by the comparator means to render the resistive circuit alternately conducting and non-conducting respectively to discharge and to permit increase of charge on the reservoir capacitor when, during each interpulse period, the reservoir capacitor voltage rises to a predetermined level above the D.C. source voltage.

4. Electrical circuit means as claimed in claim 3, wherein the control means include two comparators of which a first comparator is adapted to actuate the energy extracting means when the reservoir capacitor voltage rises above the predetermined value and the second comparator is adapted to cease actuation of the energy extracting means when the voltage on the reservoir capacitor falls to a further predetermined value.

5. Electrical circuit means as claimed in claim 1, wherein the control means comprise switching circuit means adapted to control the reservoir capacitor voltage during interpulse periods by repeatedly discharging and re-charging the commutating capacitor when during interpulse periods, the reservoir capacitor attains a predetermined voltage above the D.C. source voltage.

6. Electrical circuit means as claimed in claim 5, wherein the commutating capacitor is connected in one diagonal of a bridge of thyristors the other diagonal of which is connected to a main thyristor of the pulse controller of the load and the switching circuit means for the bridge thyristors operate repeatedly to reverse the connection of the commutating capacitor to the D.C. source when the voltage on the reservoir capacitor during interpulse periods exceeds the source voltage by a predetermined amount thereby to discharge and re-charge in the reverse sense the commutating capacitor, the reservoir capacitor voltage falling during discharge and rising during reverse charging of the commutating capacitor.

7. Electrical circuit means as claimed in claim 6, wherein there is provided a pulse generating circuit which supplies pulses to a bistable circuit to change the state thereof and the bistable circuit in its alternative states operates respective driver circuits, the latter respectively operating to reverse the connections of the commutating capacitor with respect to the D.C. source.

8. Electrical circuit means as claimed in claim 7, wherein a comparator is provided which is connected to the bistable circuit and to compare the voltage of the reservoir capacitor with a pre-set voltage which is greater than the D.C. source voltage so that when the pre-set voltage is exceeded by the reservoir capacitor voltage, the comparator causes reversal of the connections to the commutating capacitor.

* * * * *